United States Patent
Hundemer

(10) Patent No.: US 9,621,935 B2
(45) Date of Patent: Apr. 11, 2017

(54) USING BITRATE DATA TO OUTPUT AN ALERT INDICATING A FUNCTIONAL STATE OF BACK-UP MEDIA-BROADCAST SYSTEM

(71) Applicant: Tribune Broadcasting Company, LLC, Chicago, IL (US)

(72) Inventor: Hank J. Hundemer, Bellevue, KY (US)

(73) Assignee: Tribune Broadcasting Company, LLC, Chicago, IL (US)

(*) Notice: Subject to any disclaimer, the term of this patent is extended or adjusted under 35 U.S.C. 154(b) by 0 days.

(21) Appl. No.: 14/676,293

(22) Filed: Apr. 1, 2015

(65) Prior Publication Data

US 2016/0295259 A1  Oct. 6, 2016

(51) Int. Cl.
*H04N 7/173* (2011.01)
*H04N 21/24* (2011.01)
*H04L 29/06* (2006.01)
*H04N 21/234* (2011.01)
*H04N 21/2343* (2011.01)
*H04N 21/2662* (2011.01)
(Continued)

(52) U.S. Cl.
CPC ....... *H04N 21/2404* (2013.01); *H04L 65/601* (2013.01); *H04N 21/2181* (2013.01); *H04N 21/23116* (2013.01); *H04N 21/23418* (2013.01); *H04N 21/23439* (2013.01); *H04N 21/2662* (2013.01); *H04N 21/4882* (2013.01); *H04N 21/64738* (2013.01); *H04N 21/64792* (2013.01); *H04N 21/8126* (2013.01)

(58) Field of Classification Search
CPC ..................... H04N 21/2404; H04N 21/23418
USPC .......................................................... 725/32
See application file for complete search history.

(56) References Cited

U.S. PATENT DOCUMENTS 6,335,676 B1 * 1/2002 Gotoh .................. H04W 8/245
340/4.21
7,421,305 B2   9/2008 Burges et al.
(Continued)

FOREIGN PATENT DOCUMENTS

EP        2750405 A2      7/2014

OTHER PUBLICATIONS

Notice of Allowance dated Sep. 30, 2015 of U.S. Appl. No. 14/676,262, filed Apr. 1, 2015.
(Continued)

*Primary Examiner* — Nasser Goodarzi
*Assistant Examiner* — Jaycee Imperial
(74) *Attorney, Agent, or Firm* — McDonnell Boehnen Hulbert & Berghoff LLP

(57) ABSTRACT

In one aspect, an example method for outputting an alert indicating a functional state of a back-up media-broadcast system involves: a computing device determining first bitrate-data associated with a first compressed media-stream; the computing device determining second bitrate-data associated with a second compressed media-stream; the computing device making a determination that the determined first bitrate-data and the determined second bitrate-data lack a threshold extent of similarity; and responsive to the determination that the determined first bitrate-data and the determined second bitrate-data lack the threshold extent of similarity, the computing device outputting an alert.

9 Claims, 4 Drawing Sheets

(51) Int. Cl.
| | |
|---|---|
| H04N 21/647 | (2011.01) |
| H04N 21/81 | (2011.01) |
| H04N 21/218 | (2011.01) |
| H04N 21/231 | (2011.01) |
| H04N 21/488 | (2011.01) |

(56) References Cited

U.S. PATENT DOCUMENTS

| | | | |
|---|---|---|---|
| 8,643,785 B2 | 2/2014 | Kurita et al. | |
| 8,872,979 B2 | 10/2014 | Bagga et al. | |
| 8,913,187 B1 | 12/2014 | Miner et al. | |
| 8,938,089 B1 | 1/2015 | Postelnicu et al. | |
| 8,947,595 B1 | 2/2015 | Tucker et al. | |
| 8,953,891 B1 | 2/2015 | Hundemer et al. | |
| 9,010,622 B2 | 4/2015 | Kim | |
| 2002/0009143 A1* | 1/2002 | Arye | H04N 21/23424 375/240.16 |
| 2004/0258397 A1 | 12/2004 | Kim | |
| 2005/0172312 A1 | 8/2005 | Lienhart et al. | |
| 2006/0129822 A1* | 6/2006 | Snijder | H04H 60/56 713/176 |
| 2007/0030966 A1 | 2/2007 | Sra et al. | |
| 2008/0189753 A1* | 8/2008 | Nesvadba | H04N 5/4401 725/105 |
| 2009/0064248 A1* | 3/2009 | Kwan | H04L 12/1868 725/109 |
| 2010/0100923 A1 | 4/2010 | Toiyama | |
| 2011/0026763 A1 | 2/2011 | Diggins | |
| 2011/0134321 A1 | 6/2011 | Berry et al. | |
| 2011/0141364 A1 | 6/2011 | Lee et al. | |
| 2011/0149753 A1 | 6/2011 | Bapst et al. | |
| 2011/0208744 A1 | 8/2011 | Chandiramani et al. | |
| 2011/0307932 A1* | 12/2011 | Fan | H04N 21/2547 725/110 |
| 2013/0135995 A1 | 5/2013 | Wu et al. | |
| 2013/0163957 A1 | 6/2013 | Ikizyan et al. | |
| 2014/0109157 A1 | 4/2014 | Kellicker | |
| 2014/0259041 A1 | 9/2014 | Sharifi | |
| 2014/0325556 A1 | 10/2014 | Hoang et al. | |
| 2015/0341410 A1* | 11/2015 | Schrempp | H04L 65/601 709/231 |
| 2016/0014473 A1* | 1/2016 | Sun | H04N 21/44008 725/32 |
| 2016/0065994 A1* | 3/2016 | Kokaska | H04N 19/89 375/240.26 |
| 2016/0105689 A1* | 4/2016 | Sorlander | H04N 21/6143 375/240.27 |
| 2016/0127755 A1* | 5/2016 | Woods | H04N 21/2665 725/19 |

OTHER PUBLICATIONS

Non-Final Office Action mailed Nov. 19, 2015 of U.S. Appl. No. 14/676,297, filed Apr. 1, 2015.
Non-Final Office Action mailed Nov. 24, 2015 of U.S. Appl. No. 14/676,319, filed Apr. 1, 2015.
Hundemer, Hank J., U.S. Appl. No. 14/992,699, filed Jan. 11, 2016.
Hundemer, Hank J., U.S. Appl. No. 14/676,245, filed Apr. 1, 2015.
Hundemer, Hank J., U.S. Appl. No. 14/676,256, filed Apr. 1, 2015.
Hundemer, Hank J., U.S. Appl. No. 14/676,262, filed Apr. 1, 2015.
Hundemer, Hank J., U.S. Appl. No. 14/676,297, filed Apr. 1, 2015.
Hundemer, Hank J., U.S. Appl. No. 14/676,276, filed Apr. 1, 2015.
Hundemer, Hank J., U.S. Appl. No. 14/676,319, filed Apr. 1, 2015.
Ex Parte Quayle Action dated Apr. 28, 2016 of U.S. Appl. No. 14/676,245, filed Apr. 1, 2015.
Non-Final Office Action dated Apr. 21, 2016 of U.S. Appl. No. 14/676,256, filed Apr. 1, 2015.
Notice of Allowance dated Apr. 8, 2016 of U.S. Appl. No. 14/676,297, filed Apr. 1, 2015.
Notice of Allowance dated Apr. 11, 2016 of U.S. Appl. No. 14/676,319, filed Apr. 1, 2015.
Non-Final Office Action dated Feb. 11, 2016 of U.S. Appl. No. 14/676,276, filed Apr. 1, 2015.
Non-Final Office Action mailed Sep. 19, 2016 of U.S. Appl. No. 15/205,893, filed Jul. 8, 2016.
Notice of Allowance dated Oct. 10, 2016 of U.S. Appl. No. 14/676,256, filed Apr. 1, 2015.
Hundemer, Hank J., U.S. Appl. No. 15/204,760, filed Jul. 7, 2016.
Hundemer, Hank J., U.S. Appl. No. 15/205,893, filed Jul. 8, 2016.
International Search Report mailed on Jul. 12, 2016 issued in connection with International Application No. PCT/US2016/024844, filed on Mar. 30, 2016, 3 pages.
Written Opinion of the International Searching Authority mailed on Jul. 12, 2016 issued in connection with International Application No. PCT/US2016/024844, filed on Mar. 30, 2016, 8 pages.
International Search Report mailed on Jul. 13, 2016 issued in connection with International Application No. PCT/US2016/024846, filed on Mar. 30, 2016, 3 pages.
Written Opinion of the International Searching Authority mailed on Jul. 13, 2016 issued in connection with International Application No. PCT/US2016/024846, filed on Mar. 30, 2016, 7 pages.
International Search Report mailed on Jul. 8, 2016 issued in connection with International Application No. PCT/US2016/024847, filed on Mar. 30, 2016, 3 pages.
Written Opinion of the International Searching Authority mailed on Jul. 8, 2016 issued in connection with International Application No. PCT/US2016/024847, filed on Mar. 30, 2016, 7 pages.
International Search Report mailed on Jul. 22, 2016 issued in connection with International Application No. PCT/US2016/024849, filed on Mar. 30, 2016, 3 pages.
Written Opinion of the International Searching Authority mailed on Jul. 22, 2016 issued in connection with International Application No. PCT/US2016/024849, filed on Mar. 30, 2016, 7 pages.
Final Office Action mailed Jul. 8, 2016 of U.S. Appl. No. 14/676,276, filed Apr. 1, 2015.
Final Office Action mailed Aug. 10, 2016 of U.S. Appl. No. 14/676,293, filed Apr. 1, 2015.
Notice of Allowance dated Aug. 11, 2016 of U.S. Appl. No. 14/676,245, filed Apr. 1, 2015.
Written Opinion of the International Searching Authority mailed on Aug. 18, 2016 issued in connection with International Application No. PCT/US2016/024848, filed on Mar. 30, 2016, 7 pages.
Non-Final Office Action mailed Aug. 22, 2016 of U.S. Appl. No. 15/204,760, filed Jul. 7, 2016.
Written Opinion of the International Searching Authority mailed on Aug. 22, 2016 issued in connection with International Application No. PCT/US2016/024850, filed on Mar. 30, 2016, 7 pages.
Written Opinion of the International Searching Authority mailed on Aug. 19, 2016 issued in connection with International Application No. PCT/US2016/024851, filed on Mar. 30, 2016, 7 pages.
International Search Report mailed on Aug. 18, 2016 issued in connection with International Application No. PCT/US2016/024848, filed on Mar. 30, 2016, 3 pages.
International Search Report mailed on Aug. 22, 2016 issued in connection with International Application No. PCT/US2016/024850, filed on Mar. 30, 2016, 4 pages.
International Search Report mailed on Aug. 19, 2016 issued in connection with International Application No. PCT/US2016/024851, 3 pages.
Notice of Allowance dated Nov. 7, 2016 of U.S. Appl. No. 14/992,699 filed Jan. 11, 2016.
Notice of Allowance dated Dec. 30, 2016 of U.S. Appl. No. 15/204,760 filed Jul. 7, 2016.
Notice of Allowance dated Jan. 25, 2017 of U.S. Appl. No. 14/676,276 filed Apr. 1, 2015.
Notice of Allowance dated Jan. 23, 2017 of U.S. Appl. No. 15/205,893 filed Jul. 8, 2017.
Non-Final Office Action dated Feb. 8, 2017 of U.S. Appl. No. 15/398,258 filed Jan. 4, 2017.

* cited by examiner

USING BITRATE DATA TO OUTPUT AN ALERT INDICATING A FUNCTIONAL STATE OF BACK-UP MEDIA-BROADCAST SYSTEM

USAGE AND TERMINOLOGY

Throughout this application, with respect to all reasonable derivatives of such terms, and unless otherwise specified (and/or unless the particular context clearly dictates otherwise), each usage of "a" or "an" means at least one, and each usage of "the" means the at least one.

BACKGROUND

Unless otherwise indicated herein, the materials described in this section are not prior art to the claims in this disclosure and are not admitted to be prior art by inclusion in this section.

A media-broadcast system may be configured to generate and broadcast a media stream to a set of receivers (e.g., set-top boxes) for viewing and/or listening by end-users. In some instances, two different media-broadcast systems (a primary and a back-up) may be configured to generate the same (or substantially the same) media streams at the same (or substantially the same) time. As such, the primary and back-up systems may generate primary and back-up streams, respectively. With this arrangement, the primary system may broadcast the primary stream to the set of receivers unless and until the primary system becomes inoperative, in which case the back-up system may take over and broadcast the back-up stream to the set of receivers instead.

SUMMARY

In a first aspect, an example method for outputting an alert indicating a functional state of a back-up media-broadcast system involves: a computing device determining first bitrate-data associated with a first compressed media-stream; the computing device determining second bitrate-data associated with a second compressed media-stream; the computing device making a determination that the determined first bitrate-data and the determined second bitrate-data lack a threshold extent of similarity; and responsive to the determination that the determined first bitrate-data and the determined second bitrate-data lack the threshold extent of similarity, the computing device outputting an alert.

In a second aspect, a non-transitory computer-readable medium has stored thereon program instructions that when executed cause a computing device to perform of a set of acts for outputting an alert indicating a functional state of a back-up media-broadcast system, the set of acts involving: determining first bitrate-data associated with a first compressed media-stream; determining second bitrate-data associated with a second compressed media-stream; making a determination that the determined first bitrate-data and the determined second bitrate-data lack a threshold extent of similarity; and responsive to the determination that the determined first bitrate-data and the determined second bitrate-data lack the threshold extent of similarity, outputting an alert.

In a third aspect, a computing device includes a processor and a non-transitory computer-readable medium having stored thereon program instructions that when executed by the processor cause the computing device to perform of a set of acts for outputting an alert indicating a functional state of a back-up media-broadcast system, the set of acts involving: determining first bitrate-data associated with a first compressed media-stream; determining second bitrate-data associated with a second compressed media-stream; making a determination that the determined first bitrate-data and the determined second bitrate-data lack a threshold extent of similarity; and responsive to the determination that the determined first bitrate-data and the determined second bitrate-data lack the threshold extent of similarity, outputting an alert.

DETAILED DESCRIPTION

I. Overview

Figure 1:
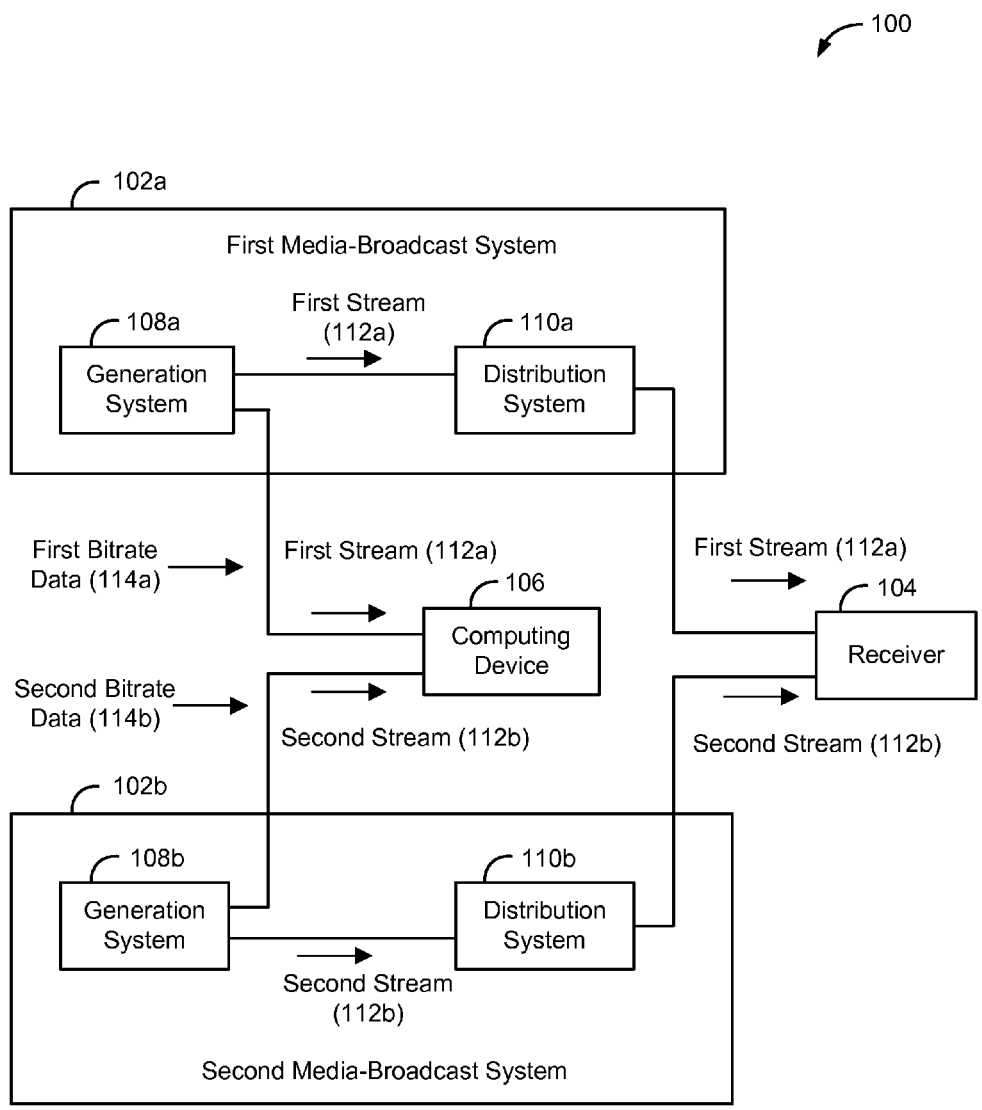
FIG. 1 is a simplified block diagram illustrating an example system according to the present disclosure.

As indicated above, in some instances, primary and back-up systems may generate primary and back-up media streams, respectively, and in the event that the primary system becomes inoperable, the back-up system may broadcast the back-up stream to take the place of the primary stream. Given this, at any given time, it may be desirable to determine a functional state of the back-up system. In particular, it may be desirable to determine whether the back-up system is in fact generating a back-up stream, thus allowing the back-up system to take over if necessary. In the event that the back-up system is not generating a back-up stream, it may be desired to output an alert so that the issue with the back-up system can be addressed.

One approach for determining a functional state of the back-up system involves a computing device conducting a bit-by-bit comparison of a primary stream and a corresponding purported back-up stream to determine whether the streams are exact copies of each other. After making this comparison, if the device determines that there is a discrepancy between the two streams, the device may output an alert (i.e., to indicate that the back-up system is not functioning properly).

However, in some cases, this approach may not provide useful results. This may be the case where the two streams are not identical, but where they represent respective portions of media content that are perceptually indistinguishable from each other (from the perspective of a typical end-user). Such streams may not be identical for a variety of reasons, such as due to a digital signal processing artifact that is present in one stream, but not in the other. Given this scenario, despite the fact that the back-up system is generating a back-up stream that should be considered to be an acceptable back-up of the primary stream, due to the nature of the bit-by-bit comparison, the device may nonetheless output an alert.

The present disclosure provides an alternative and improved approach for determining a functional state of a back-up system, and for outputting an alert indicating the functional state, and is based, at least in part, on a consideration of bitrate data associated with a compressed media-stream.

A bitrate of a media stream refers to the number of bits of the media stream that are conveyed or processed per unit of time. For example, an uncompressed high definition serial digital interface (HD-SDI) media stream standardized according to SMPTE 292M has uniform a bitrate of 1.485 Gbps.

An encoder or other compression device may compress an uncompressed media-stream to reduce its average bitrate. For example, an encoder may compress an uncompressed media-stream in accordance with the MPEG-2 compression standard set forth in SMTPE ISO/IEC 13818-1.

As part of the compression process, the encoder may generate a compressed media-stream that includes multiple portions, each of which corresponds to a respective portion of the uncompressed media-stream. Each portion of the compressed media-stream may have a bitrate that is the same, or in most cases, less than the uniform bitrate of the uncompressed media-stream. The particular bitrate of each portion of the compressed media-stream may depend on the media content represented by the corresponding portion of the uncompressed media-stream. For instance, where the uncompressed media-stream is a video stream, and a first portion thereof represents video content having little to no motion, the bitrate of the corresponding compressed video-stream may be relatively low. But where a second portion thereof represents video content having a significant amount of motion, the bitrate of the corresponding compressed video-stream may be relatively high.

In one aspect, disclosed is a method that involves a computing device (i) determining first bitrate-data associated with a first compressed media-stream, and (ii) determining second bitrate-data associated with a second compressed media-stream. One of the first and second media-streams is a primary stream, and the other is a corresponding purported back-up stream.

The method further involves the device making a determination that the determined first bitrate-data and the determined second bitrate-data lack a threshold extent of similarity, and, responsive to the determination, the device outputting an alert. As compared to the bit-by-bit comparison approach described above, by comparing bitrate data, the device may more accurately determine whether or not a purported back-up stream is in fact a back-up stream. Indeed, in the case where the first and second streams are not identical, but where they represent respective portions of media content that are perceptually indistinguishable from each other, the portions are likely to have the same (or similar) bitrate data, and therefore, in accordance with the disclosed technique, the device may appropriately forgo outputting an alert. On the other hand, in the case where the respective portions of media content are perceptually distinguishable from each other, in accordance with the disclosed technique, the device may appropriately output an alert (i.e., to indicate that the back-up system is not functioning properly).

II. Example System

FIG. 1 is a simplified block diagram illustrating an example system 100. The system 100 may include at least two media-broadcast systems, including a first system 102a and a second system 102b. One of the first and second systems 102a, 102b may serve as a primary system, and other may serve as a back-up system. The system 100 may further include a receiver 104, and a computing device 106.

The first system 102a may include a generation system 108a and a distribution system 110a. The generation system 108a may be configured for generating a first compressed media-stream 112a, and may include various components, including for example a media source, a router, a switcher, an encoder (or other compression device), and/or a broadcast automation system. The generation system 108a may be connected to the distribution system 110a, which in turn may be connected to the receiver 104. The generation system 108a may further be configured for generating first bitrate-data 114a associated with the first stream 112a. In one example, an encoder in the generation system 108a may generate the first bitrate-data 114a and embed such data in the first stream 112a.

The distribution system 110a may be configured for distributing the first stream 112a to the receiver 104. The distribution system 110a may include various components such as a terrestrial antenna or a satellite, and may be configured for distributing the first stream 112a to the receiver 104 in a variety of ways (e.g., over the air transmission). The receiver 104 may take a variety of forms, including for example, a television, a television set-top box, or a radio.

The second system 102b may be configured in a same or similar manner to that of the first system 102a. As such, the second system 102b may include a generation system 108b and a distribution system 110b. The generation system 108b may be configured for generating a second compressed media-stream 112b, and may include various components, including for example a media source, a router, a switcher, an encoder (or other compression device), and/or a broadcast automation system. The generation system 108b may further be configured for generating second bitrate-data 114b associated with the second stream 112b. In one example, an encoder in the generation system 108b may generate the second bitrate-data 114b and embed such data in the second stream 112b.

To allow for a useful comparison of the first bitrate-data 114a and the second bitrate-data 114b, it may be desired to have both generation systems 108a, 108b configured in the same or similar ways. In particular, it may be desired to have the compression settings of the encoders or other compression devices within the generation systems 108a, 108b configured in the same or similar ways.

The generation system 108b may be connected to the distribution system 110b, which in turn may be connected to the receiver 104. The distribution system 110b may be configured for distributing the second stream 112b to the receiver 104. The distribution system 110b may include various components such as a terrestrial antenna or a satellite, and may be configured for distributing the second stream 112b to the receiver 104 in a variety of ways.

While the generation system 108 may generate the first stream 112a and the generation system 108b may generate the second stream 112b at or about the same time, the system 100 may be configured such that only one of the distribution systems 110a, 110b distributes its respective generated stream to the receiver 104 at a given time. In practice, provided the first system 102a is operational, the distribution system 110a may distribute the first stream 112a to the receiver 104, unless and until the first system 102b becomes inoperative, in which case the second system 102b may take over and the distribution system 110b may distribute the second stream 112b to the receiver 104 instead. In this scenario, the first system 102a may be considered the primary system and the second system 102b may be considered the back-up system. Likewise, the first stream 112a may be considered the primary stream, and the second stream 112b may be considered the back-up stream.

Given the possibility of the second system 102b taking over for the first system 102a, at any given time, it may be desirable to determine a functional state of the second system 102b. In particular, it may be desirable to determine whether the second system 102b is in fact generating a back-up stream, thus allowing the second system 102b to take over if necessary. In the event that the second up system 102b is not generating a back-up stream, it may be desired to generate alert so that the issue with the second system 102b can be addressed (e.g., by an operator or automatically by another system).

The device 106 may be configured to generate such an alert. The device 106 may be connected to both generation systems 108b, 108b. With this arrangement, the device 106 may receive the first bitrate-data 114a and the second bitrate-data 114b (by receiving the first stream 112a and the second stream 112b, respectively). Notably, in some instances, at least one of the first bitrate-data 114a and the second bitrate-data 114b may not be embedded in a respective media stream, and thus the device 106 may separately receive at least one of the first bitrate-data 114a or the second bitrate-data 114b.

The device 106 may determine the first bitrate-data 114a by receiving the first bitrate-data 114a from the generation system 108a. In some cases, the device 106 may receive other bitrate-data from the generation system 108a, and may use the other bitrate-data to determine the first bitrate-data 114a (i.e., the device 106 may derive one set of bitrate data from another set of bitrate data).

Likewise, the device 106 may determine the second bitrate-data 114b by receiving the second bitrate-data 114b from the generation system 108b. In some cases, the device 106 may receive other bitrate-data from the generation system 108b, and may use the other bitrate-data to determine the second bitrate-data 114b.

Further, the device 106 may make a determination that the first bitrate-data 114a and the second bitrate-data 114b lack a threshold extent of similarity, and in response to the determination, the device 106 may output an alert.

In some examples, a media-broadcast system may take the form of an audio-broadcast system, a video-broadcast system, or a combination thereof. As such, a media stream may take the form of an audio stream, a video stream, or a combination thereof.

Figure 2:
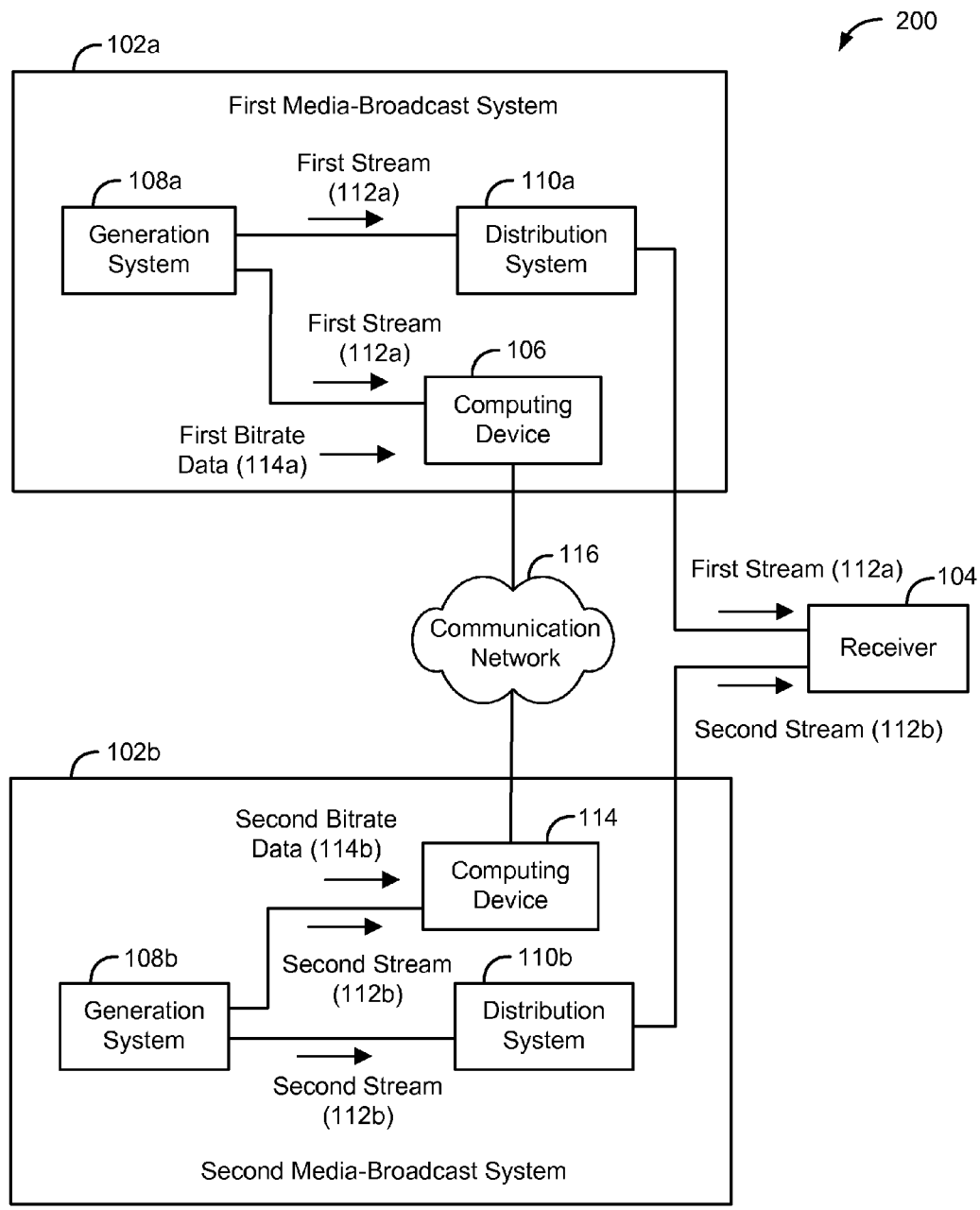
FIG. 2 is a simplified block diagram illustrating another example system according to the present disclosure.

FIG. 2 is a simplified block diagram illustrating an example system 200. The system 200 may be the same as or similar to the system 100, except that the system 200 includes another computing device 114, and a communication network 116 connecting the device 106 and the device 114, and through which the device 106 and the device 114 may communicate. The device 114 is also connected to the generation system 108b. The communication network 116 may take a variety of forms. For example, the communication network 116 may be a packet-switched network such as the Internet.

With this arrangement, the device 106 may receive the first stream 112a and the first bitrate-data 114a. Further, the device 114 may receive the second stream 112b and the second bitrate-data 114b. The device 114 may transmit the second bitrate-data 114a to the device 106, and the device 106 may receive the same. The device 106 may then make a determination that the first bitrate-data 114a and the second bitrate-data 114b lack a threshold extent of similarity, and in response to the determination, the device 106 may output an alert.

Figure 3:
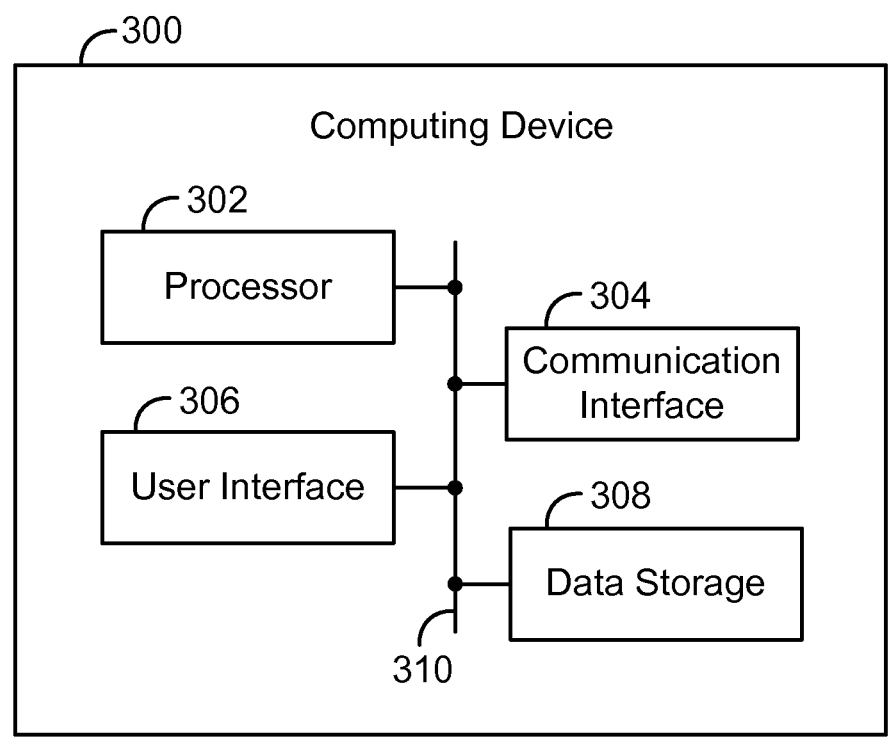
FIG. 3 is a simplified block diagram illustrating an example computing device according to the present disclosure.

FIG. 3 is a simplified block diagram illustrating an example computing device 300. The device 300 may represent the device 106 or the device 114, for instance. The device 300 may be configured for performing a variety of functions or acts, such as those described in this disclosure (including the accompanying drawings). The device 300 may include various components, including for example, a processor 302, a communication interface 304, a user interface 306, and a data storage 308. The components of the device 300 may be communicatively connected to each other (or other devices or systems) via a system bus, network, or other connection mechanism 310.

The processor 302 may include a general purpose processor (e.g., a microprocessor) and/or a special purpose processor (e.g., a digital signal processor (DSP)).

The communication interface 304 may be configured to allow the device 300 to communicate with one or more devices (or systems) according to one or more protocols. In one example, the communication interface 304 may be a wired interface, such as an Ethernet interface or a HD-SDI. As another example, the communication interface 304 may be a wireless interface, such as a cellular or WI-FI interface.

The user interface 306 may facilitate interaction with a user of the device, if applicable. As such, the user interface 306 may include input components such as a keyboard, a keypad, a mouse, a touch-sensitive panel, a microphone, and a camera, and output components such as a display screen (which, for example, may be combined with a touch-sensitive panel), a sound speaker, and a haptic feedback system.

The data storage 308 may include one or more volatile, non-volatile, removable, and/or non-removable storage components, such as magnetic, optical, or flash storage, and may be integrated in whole or in part with the processor 302. Further, the data storage 308 may take the form of a non-transitory computer-readable storage medium, having stored thereon program instructions (e.g., compiled or non-compiled program logic and/or machine code) that, when executed by the processor 302, cause the device 300 to perform one or more functions or acts, such as those described in this disclosure. Such program instructions may define or be part of a discrete software application that can be executed in response to certain inputs received from the user interface 306, for instance. The data storage 308 may also store other types of information or data, such as those types described throughout this disclosure.

III. Example Operations

Figure 4:
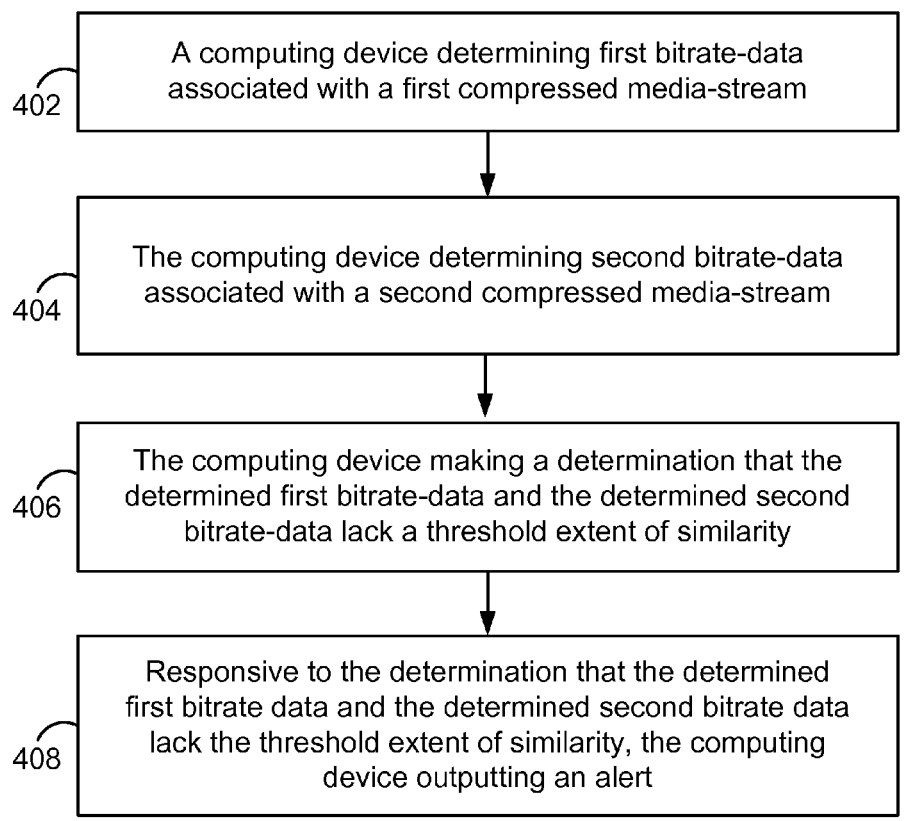
FIG. 4 is a flow chart illustrating an example method according to the present disclosure.

FIG. 4 is a flow chart illustrating an example method 400. At block 402, the method may involve a computing device determining first bitrate-data associated with a first compressed media-stream. For instance, this may involve the device 106 receiving the first bitrate-data 114a from the generation system 108a.

The first bitrate-data 114a may take a variety of forms and may include or indicate any data related to the bitrate of at least a portion of the first stream 114a. For example, the first bitrate-data 114a may indicate a first average bitrate-change over a first temporal-portion of the first stream 112a. In one example, the first temporal-portion of the first stream 112a may be 0.5 seconds of the first stream 112a. In one example, the device 106 may determine the first average bitrate-change by determining a set of instantaneous bitrates of the first stream 112a over the first temporal-portion, plotting the determined set of bitrates, and then determining a slope of the plotted set of bitrates. The determined slope represents the average bitrate change over the first temporal-period.

The first temporal-period may correspond to a time period. The device 106 may utilize a time synchronization service (e.g., a global positioning system (GPS) time synchronization service), to determine such a time period. The time period may be represented in a variety of formats, such as by specifying a number of hours, minutes, seconds, and frames (which is commonly represented in HH:MM:SS:FF format).

As another example, the first bitrate-data 114a may indicate of an occurrence of a first bitrate-change within the first stream 112a. The first bitrate-change may occur between two portions of the first stream 112a, where the two portions have different respective bitrates. In some instances, the first bitrate-data 114a may indicate a first time associated with the first bitrate-change. The device 106 may utilize a time synchronization service to determine such a time. The time may be represented in a variety of formats, such as by specifying a number of hours, minutes, seconds, and frames (which is commonly represented in HH:MM:SS:FF format).

In some instances, the first bitrate-data 114 may indicate an occurrence of a first bitrate-change of a predefined threshold amount. As another example, the first bitrate-data 114a may indicate an average bitrate (or other derived value) of a give portion of the first stream 112a (e.g., a portion representing one second).

At block 404, the method may involve the computing device determining second bitrate-data associated with a second compressed media-stream. For instance, this may involve the device 106 receiving the second bitrate-data 114b from the generation system 108b. As another example, this may involve the device 106 receiving the second bitrate-data 114b from the device 114. The second bitrate-data 114b data may also take a variety of forms, including parallel versions of those forms described above in connection with the first bitrate-data 114a.

At block 406, the method may involve the computing device making a determination that the determined first bitrate-data and the determined second bitrate-data lack a threshold extent of similarity. For instance, this may involve the device 106 making a determination that the first bitrate-data 114a and the second bitrate-data 114b lack a threshold extent of similarity.

The threshold extent of similarity may be based on a variety of factors, such as ones relating to the various example forms of bitrate data discussed above. In one example, where the first bitrate-data 114a indicates a first average bitrate-change over a first temporal-portion of the first stream 112a, the act of the device 106 making the determination that the first bitrate-data 114a and the second bitrate-data 114b lack a threshold extent of similarity may involve the device 106 determining that the determined second bitrate-data 114b does not indicate (i) a second average bitrate-change over a second temporal-portion of the second stream 112b, (ii) where the second temporal-portion of the second stream 112b corresponds to the time period, and (iii) where the second average bitrate-change is within a tolerance range of the first average bitrate-change.

In another example, where the first bitrate-data 114a indicates an occurrence of a first bitrate-change within the first stream 112a, the act of the device 106 making the determination that the first bitrate-data 114a and the second bitrate-data 114b lack a threshold extent of similarity may involve the device 106 determining that the second bitrate-data 114b does not indicate an occurrence of a second bitrate-change that is within the second stream 112b and that is within a tolerance range of the first bitrate-change.

In another example, where the first bitrate-data 114a indicates an occurrence of a first bitrate-change within the first stream 112a and a time associated with the first bitrate-change, the act of the device 106 making the determination that the first bitrate-data 114a and the second bitrate-data 114b lack a threshold extent of similarity may involve the device 106 determining that the second bitrate-data 114b does not indicate a second time associated with a second bitrate-change, where the second time is within a tolerance range of the first time.

At block 408, the method may involve responsive to the determination that the determined first bitrate-data and the determined second bitrate-data lack the threshold extent of similarity, the computing device outputting an alert. For instance, this may involve responsive to the determination that the first bitrate-data 114a and the second bitrate-data 114b lack a threshold extent of similarity, the device 106 outputting an alert.

The act of outputting an alert may take a variety of forms. For instance, this may involve the device 106 displaying a message. Alternatively or additionally, this may involve the device 106 transmitting an instruction to another system or device. Such an instruction may cause the system or device to initiate a diagnostic and/or repair process in connection with the second system 102b.

IV. Example Variations

While one or more acts have been described as being performed by certain devices, systems, or entities (e.g., the computing device 106), the acts may be performed by any device, system, or entity, such as those described in connection with the first system 100 or the second system 200. Furthermore, the devices and systems need not be discrete entities. Some or all of the devices or systems may be combined in a single device.

In addition, the acts described herein need not be performed in the disclosed order, although in some examples and order may be preferred. Also, not all acts need to be performed to achieve the desired advantages of the disclosed systems, devices, and methods, and therefore not all acts are required. Variations discussed in connection with one example may be applied to all other examples disclosed herein.

While select examples of the present disclosure have been described, alterations and permutations of these examples will be apparent to those of ordinary skill in the art. Other changes, substitutions, and alterations are also possible without departing from the invention on its broader aspects as set forth in the following claims.

The invention claimed is:

1. A method for outputting an alert indicating a functional state of a back-up media-broadcast system, the method comprising:
   a computing device determining first bitrate-data associated with a first compressed media-stream generated by a primary media-broadcast system, wherein the determined first bitrate-data associated with the first compressed media-stream indicates a first average bitrate-change over a first temporal-portion of the first compressed media-stream and wherein the first temporal-portion of the first compressed media-stream corresponds to a time period;
   the computing device determining second bitrate-data associated with a second compressed media-stream generated by the back-up media-broadcast system;

the computing device making a determination that the determined first bitrate-data and the determined second bitrate-data lack a threshold extent of similarity, wherein making the determination that the determined first bitrate-data and the determined second bitrate-data lack the threshold extent of similarity comprises determining that the determined second bitrate-data associated with the second compressed media-stream does not indicate (i) a second average bitrate-change over a second temporal-portion of the second compressed media-stream, (ii) where the second temporal-portion of the second compressed media-stream corresponds to the time period, and (iii) where the second average bitrate-change is within a tolerance range of the first average bitrate-change; and responsive to the determination that the determined first bitrate-data and the determined second bitrate-data lack the threshold extent of similarity, the computing device outputting an alert.

2. The method of claim 1, wherein outputting an alert comprises displaying a message.

3. The method of claim 1, wherein outputting an alert comprises transmitting an instruction.

4. A non-transitory computer-readable medium having stored thereon program instructions that when executed cause a computing device to perform a set of acts for outputting an alert indicating a functional state of a back-up media-broadcast system, the set of acts comprising:

determining first bitrate-data associated with a first compressed media-stream generated by a primary media-broadcast system, wherein the determined first bitrate-data associated with the first compressed media-stream indicates a first average bitrate-change over a first temporal-portion of the first compressed media-stream and wherein the first temporal-portion of the first compressed media-stream corresponds to a time period;

determining second bitrate-data associated with a second compressed media-stream generated by the back-up media-broadcast system;

making a determination that the determined first bitrate-data and the determined second bitrate-data lack a threshold extent of similarity, wherein making the determination that the determined first bitrate-data and the determined second bitrate-data lack the threshold extent of similarity comprises determining that the determined second bitrate-data associated with the second compressed media-stream does not indicate (i) a second average bitrate-change over a second temporal-portion of the second compressed media-stream, (ii) where the second temporal-portion of the second compressed media-stream corresponds to the time period, and (iii) where the second average bitrate-change is within a tolerance range of the first average bitrate-change; and responsive to the determination that the determined first bitrate-data and the determined second bitrate-data lack the threshold extent of similarity, outputting an alert.

5. The non-transitory computer-readable medium of claim 4, wherein outputting an alert comprises displaying a message.

6. The non-transitory computer-readable medium of claim 4, wherein outputting an alert comprises transmitting an instruction.

7. A computing device comprising:

a processor; and a non-transitory computer-readable medium having stored thereon program instructions that when executed by the processor cause the computing device to perform of a set of acts for outputting an alert indicating a functional state of a back-up media-broadcast system, the set of acts comprising:

determining first bitrate-data associated with a first compressed media-stream generated by a primary media-broadcast system, wherein the determined first bitrate-data associated with the first compressed media-stream indicates a first average bitrate-change over a first temporal-portion of the first compressed media-stream and wherein the first temporal-portion of the first compressed media-stream corresponds to a time period;

determining second bitrate-data associated with a second compressed media-stream generated by the back-up media-broadcast system;

making a determination that the determined first bitrate-data and the determined second bitrate-data lack a threshold extent of similarity, wherein making the determination that the determined first bitrate-data and the determined second bitrate-data lack the threshold extent of similarity comprises determining that the determined second bitrate-data associated with the second compressed media-stream does not indicate (i) a second average bitrate-change over a second temporal-portion of the second compressed media-stream, (ii) where the second temporal-portion of the second compressed media-stream corresponds to the time period, and (iii) where the second average bitrate-change is within a tolerance range of the first average bitrate-change; and responsive to the determination that the determined first bitrate-data and the determined second bitrate-data lack the threshold extent of similarity, outputting an alert.

8. The computing device of claim 7, wherein outputting an alert comprises displaying a message.

9. The computing device of claim 7, wherein outputting an alert comprises transmitting an instruction.

* * * * *